(12) United States Patent
van den Oord et al.

(10) Patent No.: US 12,620,408 B2
(45) Date of Patent: May 5, 2026

(54) GENERATING AUDIO USING NEURAL NETWORKS

(71) Applicant: GDM Holding LLC, Mountain View, CA (US)

(72) Inventors: Aaron Gerard Antonius van den Oord, London (GB); Sander Etienne Lea Dieleman, London (GB); Nal Emmerich Kalchbrenner, Amsterdam (NL); Karen Simonyan, London (GB); Oriol Vinyals, London (GB)

(73) Assignee: GDM Holding LLC, Mountain View, CA (US)

( * ) Notice: Subject to any disclaimer, the term of this patent is extended or adjusted under 35 U.S.C. 154(b) by 0 days.

(21) Appl. No.: 18/519,986

(22) Filed: Nov. 27, 2023

(65) Prior Publication Data

US 2024/0135955 A1     Apr. 25, 2024

Related U.S. Application Data

(63) Continuation of application No. 17/838,985, filed on Jun. 13, 2022, now Pat. No. 11,869,530, which is a
(Continued)

(51) Int. Cl.
*G10L 25/30* (2013.01)
*G06N 3/04* (2023.01)
(Continued)

(52) U.S. Cl.
CPC .............. *G10L 25/30* (2013.01); *G06N 3/045* (2023.01); *G06N 3/0464* (2023.01); *G06N 3/048* (2023.01);
(Continued)

(58) Field of Classification Search
CPC .......................... G10L 25/30; G10H 2250/311
See application file for complete search history.

(56) References Cited

U.S. PATENT DOCUMENTS

| | | | |
|---|---|---|---|
| 2,810,457 | A | 10/1957 | Halliday |
| 5,377,302 | A | 12/1994 | Tsiang |

(Continued)

FOREIGN PATENT DOCUMENTS

| | | |
|---|---|---|
| CA | 2810457 | 9/2014 |
| CN | 102047321 | 5/2011 |

(Continued)

OTHER PUBLICATIONS

Paszke et al. "ENet: A Deep Neural Network Architecture for Real-Time Semantic Segmentation". arXiv: 1606.02147v1 [cs.CV] Jun. 7, 2016 (Year: 2016).*

(Continued)

*Primary Examiner* — Jesse S Pullias
(74) *Attorney, Agent, or Firm* — Fish & Richardson P.C.

(57) ABSTRACT

Methods, systems, and apparatus, including computer programs encoded on computer storage media, for generating an output sequence of audio data that comprises a respective audio sample at each of a plurality of time steps. One of the methods includes, for each of the time steps: providing a current sequence of audio data as input to a convolutional subnetwork, wherein the current sequence comprises the respective audio sample at each time step that precedes the time step in the output sequence, and wherein the convolutional subnetwork is configured to process the current sequence of audio data to generate an alternative representation for the time step; and providing the alternative representation for the time step as input to an output layer, wherein the output layer is configured to: process the alternative representation to generate an output that defines
(Continued)

Audio Sequence
152

142

Neural Network System
100

140

Score Distribution 146

Output Layer
120

Alternative Representation 144

Convolutional Subnetwork
110

Neural Network Input
102 a score distribution over a plurality of possible audio samples for the time step.

20 Claims, 4 Drawing Sheets

Related U.S. Application Data continuation of application No. 17/020,348, filed on Sep. 14, 2020, now Pat. No. 11,386,914, which is a continuation of application No. 16/390,549, filed on Apr. 22, 2019, now Pat. No. 10,803,884, which is a continuation of application No. 16/030,742, filed on Jul. 9, 2018, now Pat. No. 10,304,477, which is a continuation of application No. PCT/US2017/050320, filed on Sep. 6, 2017.

(60)  Provisional application No. 62/384,115, filed on Sep. 6, 2016.

(51)  Int. Cl.
| | |
|---|---|
| *G06N 3/045* | (2023.01) |
| *G06N 3/0464* | (2023.01) |
| *G06N 3/048* | (2023.01) |
| *G10L 13/06* | (2013.01) |

(52)  U.S. Cl.
CPC ........ *G10L 13/06* (2013.01); *G10H 2250/311* (2013.01)

(56)  References Cited

U.S. PATENT DOCUMENTS

| | | | |
|---|---|---|---|
| 5,668,926 A | 9/1997 | Karaali et al. | |
| 5,913,194 A | 6/1999 | Karaali et al. | |
| 7,409,340 B2 | 8/2008 | Holzapfel | |
| 8,527,276 B1 | 9/2013 | Senior | |
| 8,645,137 B2 | 2/2014 | Bellegarda et al. | |
| 9,058,811 B2 | 6/2015 | Wang | |
| 9,190,053 B2 | 11/2015 | Penn | |
| 9,595,002 B2 | 3/2017 | Leeman-Munk et al. | |
| 9,734,824 B2 | 8/2017 | Penn | |
| 9,824,684 B2 | 11/2017 | Yu et al. | |
| 9,953,634 B1 | 4/2018 | Pearce | |
| 9,972,314 B2 | 5/2018 | Wang et al. | |
| 10,043,512 B2 | 8/2018 | Jaitly et al. | |
| 10,049,106 B2 | 8/2018 | Goyal | |
| 10,304,477 B2 | 5/2019 | Van den Oord et al. | |
| 10,354,015 B2 | 7/2019 | Kalchbrenner et al. | |
| 10,403,269 B2 | 9/2019 | Sainath et al. | |
| 10,460,747 B2 | 10/2019 | Roblek | |
| 10,714,077 B2 | 7/2020 | Song et al. | |
| 10,803,884 B2 | 10/2020 | van den Oord | |
| 10,977,529 B2 | 4/2021 | Szegedy et al. | |
| 11,080,591 B2 | 8/2021 | Van Den Oord et al. | |
| 11,386,914 B2 | 7/2022 | van den Oord et al. | |
| 2002/0011024 A1 | 1/2002 | Baldwin et al. | |
| 2002/0110248 A1 | 8/2002 | Kovales | |
| 2006/0064177 A1 | 3/2006 | Tian et al. | |
| 2009/0210218 A1 | 8/2009 | Collobert et al. | |
| 2012/0166198 A1 | 6/2012 | Lin | |
| 2012/0323521 A1 | 12/2012 | De Foras et al. | |
| 2015/0032449 A1 | 1/2015 | Sainath et al. | |
| 2015/0356075 A1 | 12/2015 | Rao et al. | |
| 2016/0023244 A1 | 1/2016 | Zhuang et al. | |
| 2016/0035344 A1 | 2/2016 | Gonzalez-Dominguez et al. | |
| 2016/0063359 A1 | 3/2016 | Szegedy et al. | |
| 2016/0093278 A1 | 3/2016 | Esparza | |
| 2016/0099010 A1 | 4/2016 | Sainath et al. | |
| 2016/0140951 A1 | 5/2016 | Agionnyrgiannakis | |
| 2016/0180162 A1 | 6/2016 | Cetintas et al. | |
| 2016/0232440 A1 | 8/2016 | Gregor | |
| 2016/0343366 A1 | 11/2016 | Fructuoso et al. | |

| | | | |
|---|---|---|---|
| 2017/0011738 A1 | 1/2017 | Senior | |
| 2017/0103752 A1 | 4/2017 | Senior | |
| 2017/0148431 A1 | 5/2017 | Catanzaro et al. | |
| 2017/0262737 A1 | 9/2017 | Rabinovich | |
| 2017/0330586 A1 | 11/2017 | Roblek et al. | |
| 2018/0025257 A1 | 1/2018 | van den Oord et al. | |
| 2018/0025721 A1 | 1/2018 | Li | |
| 2018/0068207 A1 | 3/2018 | Szegedy et al. | |
| 2018/0075343 A1 | 3/2018 | Van den Oord et al. | |
| 2018/0322891 A1 | 11/2018 | Van den Oord et al. | |
| 2018/0329897 A1 | 11/2018 | Kalchbrenner et al. | |
| 2018/0365554 A1 | 12/2018 | Van den Oord et al. | |
| 2019/0043516 A1 | 2/2019 | Germain et al. | |
| 2019/0066713 A1 | 2/2019 | Mesgarani et al. | |
| 2019/0378498 A1 | 12/2019 | Sainath et al. | |
| 2020/0051583 A1 | 2/2020 | Wu | |
| 2020/0342183 A1 | 10/2020 | Kalchbrenner et al. | |

FOREIGN PATENT DOCUMENTS

| | | |
|---|---|---|
| CN | 104681034 | 6/2015 |
| CN | 105068998 | 11/2015 |
| CN | 105096939 | 11/2015 |
| CN | 105144164 | 12/2015 |
| CN | 105159890 | 12/2015 |
| CN | 105210064 | 12/2015 |
| CN | 105321525 | 2/2016 |
| CN | 105513591 | 4/2016 |
| JP | 1991071196 | 11/1991 |
| JP | H08512150 | 12/1996 |
| JP | H10333699 | 12/1998 |
| JP | 1999282484 | 10/1999 |
| JP | 2002123280 | 4/2002 |
| JP | 6750121 | 9/2020 |
| KR | 1020080026951 | 3/2008 |
| KR | 1020080042083 | 5/2008 |
| KR | 1020140056368. | 5/2014 |
| KR | 1020150104111 | 9/2015 |
| KR | 1020160013710 | 2/2016 |
| KR | 101855597 | 5/2018 |
| WO | WO 2018048945 | 3/2018 |

OTHER PUBLICATIONS

Tokuda et al. "Directly Modeling Speech Waveforms by Neural Networks for Statistical Parametric Speech Synthesis". ICASSP 2015 (Year: 2015).*
Keren et al. "Convolutional RNN: An enhanced model for extracting features from sequential data". 2016 International Joint Conference on Neural Networks, 24-29, Jul. 2016, Vancouver, BC, Canada, pp. 3412-3419 (Year: 2016).*
Veit et al. "Residual Networks are Exponential Ensembles of Relatively Shallow Networks". arXiv:1605.06431v1 [cs.CV] May 20, 2016 (Year: 2016).*
Graves, Alex. "Generating Sequences with Recurrent Neural Networks". arXiv:1308.0850v5 [cs.NE] Jun. 5, 2014 (Year: 2014).*
Agiomyrgiannakis, "Vocain the vocoder and applications is speech synthesis," IEEE International Conference on Acoustics, Speech and Signal Processing, Apr. 19, 2015, 5 pages.
Allowance of Patent in Korean Appln. No. 10-2019-7008257, dated Apr. 18, 2022, 3 pages (with English translation).
Allowance of Patent in Korean Appln. No. 10-2019-7013231, dated Jan. 8, 2022, 3 pages (with English translation).
Allowance of Patent in Korean Appln. No. 10-2022-7003520, dated Aug. 31, 2022, 4 pages (with English translation).
Bahdanau et al., "Neural machine translation by jointly learning to align and translation," arXiv 1409.0473v7, May 19, 2016, 15 pages.
Berglund et al., "Bidirectional Recurrent Neural Networks as Generative Models," Advances in Neural Information Processing Systems 28 (NIPS 2015), 2015, 9 pages.
Bishop, "Mixture density networks," Technical Report NCRG/94/004, Neural Computing Research Group, Aston University, 1994, 26 pages.
Chen et al., "Semantic image segmentation with deep convolutional nets and fully connected CRF's," arXiv 1412.7062v4, Jun. 7, 2016, 14 pages.

(56) References Cited

OTHER PUBLICATIONS

CN Office Action in Chinese Appln. No. 201780065523.6, dated Jan. 6, 2020, 14 pages (with English translation).

Decision to Grant a Patent in Japanese Appln. No. 2019-150456, dated Apr. 26, 2021, 5 pages (with English translation).

Decision to Grant a Patent in Japanese Appln. No. 2021-087708, dated Dec. 19, 2022, 5 pages (with English translation).

Decision to Grant Patent in Japanese Appln. No. 2020-135790, dated Apr. 4, 2022, 5 pages (with English translation).

EP Extended Search Report in European Appln. No. 20192441.2, dated Dec. 23, 2020, 8 pages.

EP Extended Search Report in European Appln. No. 20195353.6, dated Apr. 21, 2021, 7 pages.

EP Office Action in European Appln. 17794596.1, dated Jun. 5, 2019, 3 pages.

Fan et al., "TTS synthesis with bidirectional LSTM based recurrent neural networks," Fifteenth Annual Conference of the International Speech Communication Association, 2014, 5 pages.

Fant et al., "TTS synthesis with bidirectional LSTM based recurrent neural networks," Interspeech, Sep. 2014, 5 pages.

Fisher et al., "WaveMedic: Convolutional Neural Networks for Speech Audio Enhancement," Stanford University, Sep. 2020, 6 pages.

Gonzalvo et al., "Recent advances in Google real-time HMM-driven unit selection synthesizer," In Proc. Interspeech, Sep. 2016, 5 pages.

He et al., "Deep residual learning for image recognition," arXiv 1512.03385v1, Dec. 10, 2015, 12 pages.

Hertel et al., "Comparing Time and Frequency Domain for Audio Event Recognition Using Deep Learning," 2016 International Joint Conference on Neural Networks, Mar. 2016, 5 pages.

Hochreiter et al., "Long short-term memory," Neural Computation 9(8), Nov. 1997, 46 pages.

Homepages.inf.ed.ac.uk [online] "CSTR VCTK Corpus English Multi-Speaker Corpus for CSTR Voice Cloning Toolkit," available on or before Mar. 13, 2013, via Internet Archive Wayback Machine at URL<https://web.archive.org/web/20130315110746/http://homepages.inf.ed.ac.uk/jyamagis/page3/page58/page58.html>, retrieved on Feb. 19, 2021, 2 pages.

Hoshen et al., "Speech acoustic modeling from raw multichannel waveforms," IEEE International Conference on Acoustics, Speech and Signal Processing, Apr. 19, 2015, 5 pages.

Hunt et al., "Unit selection in a concatenative speech synthesis system using a large speech database," IEEE International Conference on Acoustics, Speech and Signal Processing, May 7, 1996, 4 pages.

International Preliminary Report on Patentability issued in International Application No. PCT/US2017/050320, mailed on Dec. 14, 2018, 7 pages.

International Preliminary Report on Patentability issued in International Application No. PCT/US2017/050335, mailed on Dec. 14, 2018, 7 pages.

International Search Report and Written Opinion issued in International Application No. PCT/US2017/050320, mailed on Jan. 2, 2018, 16 pages.

International Search Report and Written Opinion issued in International Application No. PCT/US2017/050335, mailed on Jan. 2, 2018, 16 pages.

International Search Report and Written Opinion issued in International Application No. PCT/US2017/058046, mailed on Jan. 31, 2018, 15 pages.

Jozefowicz et al., "Exploring the limits of language modeling," arXiv 1602.02410v2 Feb. 11, 2016, 11 pages.

Kalchbrenner et al., "Neural Machine Translation in Linear Time," CoRR, Oct. 2016, arxiv.org/abs/1610.10099, 9 pages.

Kalchbrenner et al., "Video pixel networks," arXiv 1610.00527v1, Oct. 3, 2016, 16 pages.

Karaali, "text-to-speech conversion with neural networks: A recurrent TDNN approach," cs.NE/9811032, Nov. 24, 1998, 4 pages.

Kawahara et al., "Aperiodicity extraction and control using mixed mode excitation and group delay manipulation for a high quality speech analysis, modification and synthesis system straight," Second International Workshop on Models and Analysis of Vocal Emissions for Biomedical Applications, Sep. 2001, 6 pages.

Kawahara et al., "Restructuring speech representations using a pitch-adaptive time-frequency smoothing and an instantaneous-frequency-based f0 extraction: possible role of a repetitive structure in sounds," Speech Comm., Sep. 1999, 27(3):17 pages.

Lamb et al., "Convolutional encoders for neural machine translation," Project reports of 2015 CS224d course at Stanford university, Jun. 22, 2015, 8 pages.

Law et al., "Input-agreement: a new mechanism for collecting data using human computation games," Proceedings of the SIGCHI Conference on Human Factors in Computing Systems, ACM, Apr. 4, 2009, 10 pages.

Lee et al., "Fully character-level neural machine translation without explicit segmentation," arXiv 1610.03017v1, Oct. 10, 2016, 14 pages.

Maia et al., "Statistical parametric speech synthesis with joint estimation of acoustic and excitation model parameters," ISCA SSW7, Sep. 24, 2010, 6 pages.

Meng et al., "Encoding source Language with convolutional neural network for machine translation," Proceedings of the 53rd annual meeting of the Association for Computational Linguistics and the 7th International Joint Conference on Natural Language Processing, Jul. 26, 2015, 1:11.

Morise et al., "World: A vocoder-based high-quality speech synthesis system for real-time applications," IEICE Tranc. Inf. Syst., Jul. 1, 2016, E99-D(7):8 pages.

Moulines et al., "Pitch synchronous waveform processing techniques for text-to-speech synthesis using diphones," Speech Comm., Dec. 1990, (9):15 pages.

Muthukumar et al., "A deep learning approach to data-driven parameterizations for statistical parametric speech synthesis," arXiv 1409.8558v1, Sep. 30, 2014, 5 pages.

Nair et al., "Rectified linear units improve restricted Boltzmann machines," Proceedings of the 37th International Conference on Machine Learning, Jun. 21-24, 2010, 8 pages.

Nakamura et al., "Integration of spectral feature extraction and modeling for HMM-based speech synthesis," IFICE Transaction on Information and Systems 97(6), Jun. 2014, 11 pages.

Notice of Allowance in Chinese Appln. No. 202011082855.5, dated Jan. 10, 2024, 8 pages (with English translation).

Office Action in Brazilian Appln. No. BR112019004524-4, dated Jun. 23, 2023, 6 pages (with English translation).

Office Action in Chinese Appln. No. 201780065178.6, dated Mar. 31, 2023, 8 pages (with English translation).

Office Action in Chinese Appln. No. 201780065178.6, dated Sep. 13, 2022, 16 pages (with English translation).

Office Action in Chinese Appln. No. 201780073530.0, dated Sep. 2, 2022, 14 pages (with English translation).

Office Action in European Appln. No. 17794596.1, dated Oct. 8, 2021, 11 pages.

Office Action in Indian Appln. No. 201927011194, dated Mar. 10, 2021, 7 pages (with English translation).

Office Action in Japanese Appln. No. 2019-150456, dated Nov. 30, 2020, 4 pages (with English translation).

Office Action in Japanese Appln. No. 2020-135790, dated Sep. 6, 2021, 8 pages (with English translation).

Office Action in Japanese Appln, No. 2021-087708, dated Jun. 27, 2022, 4 pages (with English translation).

Palaz et al., "Estimating phoneme class conditional probabilities from raw speech signal using convolutional neural networks," arXiv 1304.1018v2, Jun. 12, 2013, 5 pages.

PCT International Preliminary Report on Patentability in International Appln. No. PCT/US2017/058046, dated May 9, 2019, 9 pages.

Peltonen et al., "Nonlinear filter design: methodologies and challenges," ISPA Proceedings of the 2nd International Symposium on Image Signal Processing and Analysis, Jun. 2001, 6 pages.

(56)        References Cited

OTHER PUBLICATIONS

Sagisaka et al., "ATR v-talk speech synthesis system," Second International Conference on Spoken Language Processing, Oct. 1992, 4 pages.

Sainath et al., "Learning the speech front-end with raw waveform CLDNNs," Sixteenth Annual Conference of the International Speech Communication Association, Sep. 2015, 5 pages.

Takaki et al., "A deep auto-encoder based low dimensional feature extraction from FFT spectral envelopes for statistical parametric speech synthesis," IEEE International Conference on Acoustics Speech and Signal Processing, Mar. 20, 2016, 6 pages.

Theis et al., "Generative image modeling using spatial LSTMs," Advances in Neural Information Processing Systems, Dec. 2015, 9 pages.

Toda et al., "A speech parameter generation algorithm generation algorithm considering global variance for HMM-based speech synthesis," IEICE Trans. Inf. Syst., May 1, 2007, 90(5):9 pages.

Toda et al., "Statistical approach to vocal tract transfer function estimation based on factor analyzed trajectory hmm," IEEE International Conference on Acoustics, Speech and Signal Processing, Mar. 31, 2008, 4 pages.

Tokuda et al., "Directly modeling speech waveforms by neural networks for statistical parametric speech synthesis," IEEE International Conference on Acoustics, Speech and Signal Processing, Apr. 19, 2015, 5 pages.

Tokuda et al., "Directly modeling voiced and unvoiced components in speech waveforms by neural networks," IEEE International Conference on Acoustics, Speech and Signal Processing, Mar. 20, 2016, 5 pages.

Tuerk et al., "Speech synthesis using artificial neural networks trained on cepstral coefficients," Proc. Eurospeech, Sep. 1993, 4 pages.

Tuske et al., "Acoustic modeling with deep neural networks using raw time signal for LVCSR," Fifteenth Annual Conference of the International Speech Communication Association, Sep. 2014, 5 pages.

Uria et al., "Modeling acoustic feature dependencies with artificial neural networks: Trajectory-RNADE," Proceedings of the International Conference on Acoustics Speech and Signal Processing, Apr. 19, 2015, 5 pages.

Van den Oord et al., "Conditional image generation with pixelcnn decoders," arXiv 1606.05328v2, Jun. 18, 2016, 13 pages.

Van den Oord et al., "Pixel recurrent neural networks," arXiv 1601.06759v3, Aug. 19, 2016, 11 pages.

Van den Oord et al., "WaveNet: A Generative Model for Raw Audio," arXiv 1609.03499v2, Sep. 19, 2016, 15 pages.

Written Opinion issued in International Application No. PCT/US2017/050320, mailed on Aug. 3, 2018, 7 pages.

Written Opinion issued in International Application No. PCT/US2017/050335, mailed on Aug. 3, 2018, 7 pages.

Wu et al., "Minimum generation error training with direct log spectral distortion on LSPs for HMM-based speech synthesis," Interspeech, Sep. 2008, 4 pages.

www.itu.int [online] "ITU-T Recommendation G 711, Pulse Code Modulation (PCM) of voice frequencies," Nov. 1988, retrieved on Jul. 9, 2017, retrieved from URL<https://www.itu.int/rec/T-REC-G.711-198811-I/en> 1 page.

www.sp.nitech.ac [online], "Speech synthesis as a statistical machine learning problem," Dec. 2011, retrieved on Jul. 9, 2018, retrieved from Internet: URL<http://www.sp.nitech.ac.jp/~tokuda/tokuda_asru2011_for_pdf.pdf, 66 pages.

www.sp.nitech.ac.jp [online] "Speech Synthesis as A Statistical Machine Learning Problem," Dec. 14, 2011, retrieved on Feb. 19, 2021, retrieved from URL <http://hts.sp.nitech.as.jp/>, 66 pages.

Yoshimura, "Simultaneous modeling of phonetic and prosodic parameters and characteristic conversion for HMM-based text-to-speech systems," PhD thesis, Nagoya Institute of Technology, Jan. 2002, 109 pages.

Yu et al., "Multi-scale context aggregation by dilated convolutions," arXiv 1511.07122, Nov. Apr. 30, 2016, 13 pages.

Zen et al., "Fast, Compact, and high quality LSTM-RNN based statistical parametric speech synthesizers for mobile devices," arXiv 1606.06061v2, Jun. 22, 2016, 14 pages.

Zen et al., "Statistical parametric speech synthesis using deep neural networks," IEEE International Conference on Acoustics, Speech and Signal Processing, May 26, 2013, 5 pages.

Zen et al., "Statistical parametric speech synthesis," Speech Comm. 51(11) Nov. 30, 2009, 24 pages.

Zen, "An example of context-dependent label format for HMM-based speech synthesis in English," The HTS CMUARCTIC demo 133, Mar. 2, 2006, 1 page.

Office Action in Canadian Appln. No. 3,155,320, dated Aug. 21, 2024, 4 pages.

Office Action in European Appln. No. 24188470.9, dated Jan. 21, 2025, 12 pages.

* cited by examiner

GENERATING AUDIO USING NEURAL NETWORKS

CROSS-REFERENCE TO RELATED APPLICATIONS

This application is a continuation of U.S. application Ser. No. 17/838,985, filed on Jun. 13, 2022, which is a continuation of U.S. application Ser. No. 17/020,348, filed on Sep. 14, 2020 (now U.S. Pat. No. 11,386,914), which is a continuation of U.S. application Ser. No. 16/390,549, filed on Apr. 22, 2019 (now U.S. Pat. No. 10,803,884), which is a continuation of U.S. application Ser. No. 16/030,742, filed on Jul. 9, 2018 (now U.S. Pat. No. 10,304,477), which is a continuation of PCT Application No. PCT/US2017/050320, filed on Sep. 6, 2017, which claims priority to U.S. Provisional Application No. 62/384,115, filed on Sep. 6, 2016. The disclosures of the prior applications are considered part of and are incorporated by reference in the disclosure of this application.

BACKGROUND

This specification relates to processing and generating audio using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes how a system implemented as computer programs on one or more computers in one or more locations can generate a sequence of audio data that includes a respective audio sample at each of multiple time steps. For example, the sequence of audio data can represent speech in a particular natural language or a piece of music.

In one innovative aspect a neural network system implemented by one or more computers is configured to generate an output sequence of audio data that comprises a respective audio sample at each of a plurality of time steps. The neural network system may comprise a convolutional subnetwork comprising one or more audio-processing convolutional neural network layers; and an output layer. The convolutional subnetwork may be configured to, for each of the plurality of time steps: receive a current sequence of audio data that comprises the respective audio sample at each time step that precedes the (current) time step in the output sequence. The convolutional subnetwork may further be configured to process the current sequence of audio data to generate an alternative representation for the time (current) step. This alternative representation may thus comprise a numeric representation, i.e., an ordered collection of numeric values, in which the current sequence of audio data has been encoded by the convolutional subnetwork, for example encoding features of the current sequence. The output layer may be configured to, for each of the plurality of time steps: receive the alternative representation for the time step, and process the alternative representation for the time step to generate an output that defines a score distribution over a plurality of possible audio samples for the time step.

Some of the many advantages of such a system are described later. The system can use the score distribution to select a sample for the current time step, by sampling from the distribution. The output may, but need not necessarily, comprise one score for each possible audio sample value, for example 256 scores for 256 possible values. In can thus be useful to compress or compand the audio sample values, which may be amplitude values, to reduce the number of model outputs.

In some implementations the convolutional neural network layers are causal convolutional neural network layers, as described in more detail later. In particular, the audio-processing convolutional neural network layers may include one or more dilated causal convolutional neural network layers. Again as described in more detail later, a dilated convolutional neural network layer applies a convolution to non-adjacent values in a sequence, i.e., as defined by the outputs from a previous layer. This can increase the receptive field of the convolutional subnetwork by orders of magnitude whilst preserving the input (time) resolution and maintaining computational efficiency.

In some implementations the convolutional neural network layers include multiple stacked blocks of dilated convolutional neural network layers. Each block may comprise multiple dilated convolutional neural network layers with increasing dilation. For example the dilation may be increased by a factor n for each successive layer up to a limit within each block. This can further increase the receptive field size.

In some implementations one or more of the convolutional neural network layers may have gated activation units. For example a rectified linear or other unit following a convolution implemented by a layer may be replaced by a gated activation unit. In a gated activation unit the output may be a combination of two (causal) convolutions, a main convolution and a gate convolution. The convolutions may each be applied to some or all of the same outputs from the previous layer. The combination may involve a non-linear activation function applied to the gate convolution, for example an activation with a (0,1) range such as a sigmoid. This may then multiply a value from the main convolution; a non-linear activation function may, but need not be, applied to the main convolution. Such an approach may assist in capturing more complex structure within the data.

The alternative representation from the convolutional subnetwork at each time step may be conditioned on a neural network input, for example a latent representation of a conditioning input. The conditioning input may be global (substantially time-independent) and/or local (time-dependent). The conditioning input may comprise, for example, text, image or video data, or audio data, for example an example of a particular speaker or language or music. The neural network input may comprise an embedding of the conditioning input. For example in a text-to-speech system a global conditioning input may comprise a speaker embedding and a local conditioning input may comprise linguistic features. The system may be configured to map the neural network input, or a conditioning input, from a lower sampling frequency to the audio sample generation frequency, for example by repeating the input or upsampling the input using a neural network. Thus the neural network input may comprise features of a text segment and the output sequence may represent a verbalization of the text segment; and/or the neural network input may comprise speaker or intonation pattern values; and/or the neural network input may include one or more of: speaker identity information, language identity information, and speaking style information. Alternatively the output sequence represents a piece of music.

The convolutional subnetwork may comprise residual connections, for example a connection from an input of a convolutional layer to a summer to sum this with an intermediate output of the layer. This effectively allows the network to be trained to skip or partially skip a layer, thus speeding up convergence and facilitating training of deeper models. The convolutional subnetwork may additionally or alternatively comprise skip connections, for example directly from each of one or more intermediate layers of the convolutional subnetwork to one or more operations that directly generate the alternative representation that is provided to the output layer.

In some implementations processing the current sequence of audio data using the convolutional subnetwork, to generate an alternative representation for the time step, re-uses values computed for previous time steps. The re-used values may comprise values derived from application of a convolutional filter to the audio sample data or data derived therefrom. The re-used values may be stored at one time step and retrieved at a later time step when the same filter is applied to the same (or some of the same) audio sample data or data derived therefrom. This can make the system computationally more efficient and hence faster, because there is no need to re-compute the stored values.

Particular embodiments of the subject matter described in this specification can be implemented so as to realize one or more of the following advantages. The neural network system can generate on the order of tens of thousands of audio samples per second, providing a greater level of granularity than other neural network-based audio generation systems. The neural network system can achieve results that significantly outperform the state of the art on audio generation tasks, e.g., by generating speech from text that is of higher quality than state of the art techniques. A single trained neural network system can be used to generate different voices by conditioning on the speaker identity. By using convolutional neural network layers, e.g., causal convolutional layers, instead of recurrent neural network layers, e.g., instead of long short-term memory (LSTM) layers, the neural network system can achieve these advantageous results while not needing as many computational resources to train as other systems that do include recurrent neural network layers, resulting in a reduced training time. By employing convolutional layers rather than recurrent layers, the computation of the neural network system can be more easily batched and more easily parallelized, e.g., because the layers of the network do not have to be unrolled for each time step, allowing the computation of the system to be performed more efficiently. Additionally, by employing dilated causal convolutional layers, the receptive field of the convolutional subnetwork and, therefore, the quality of the audio generated by the system, can be improved without greatly increasing the computational cost of generating the audio.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
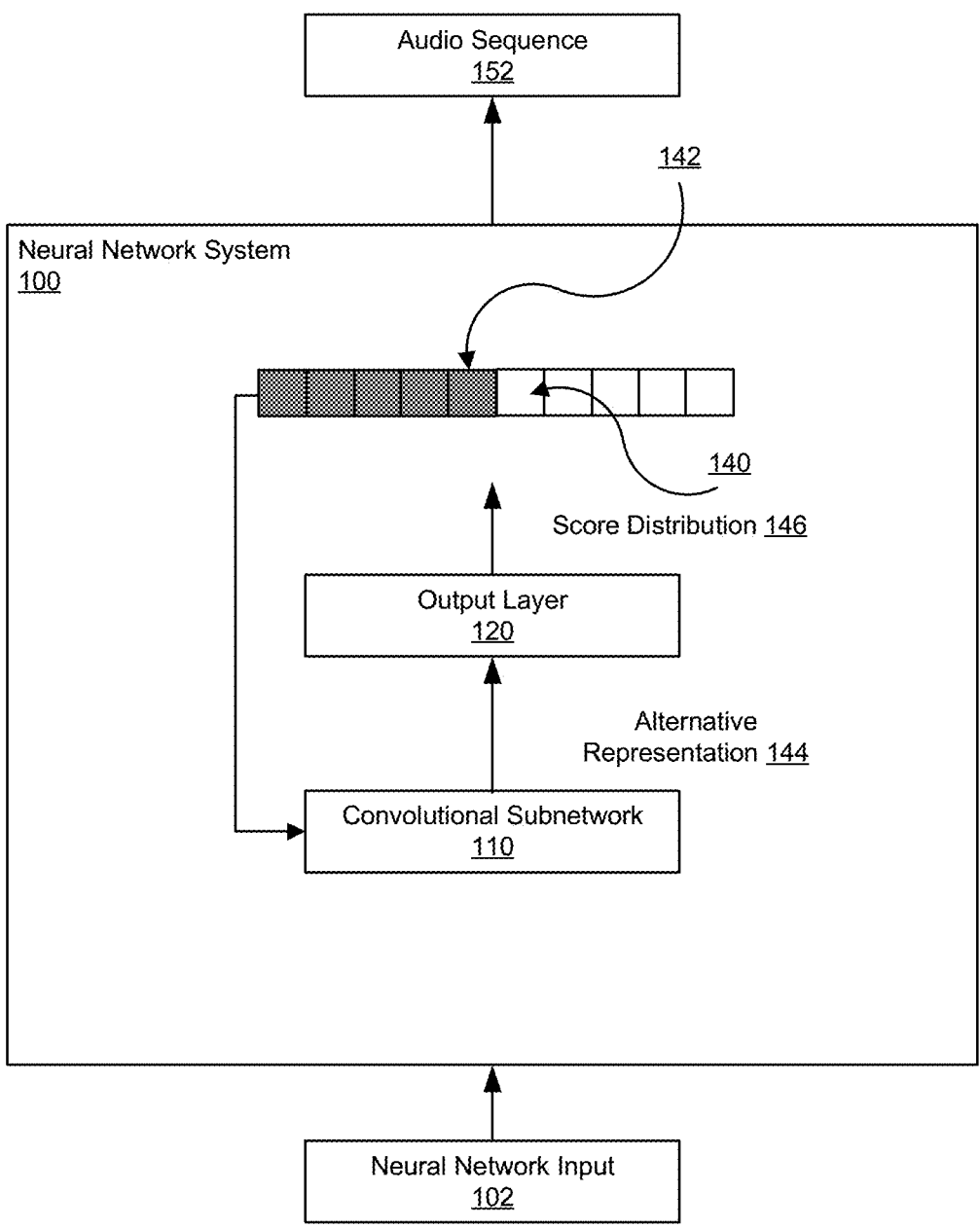
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 generates sequences of audio data that each include a respective audio sample at each of multiple time steps, e.g., an output sequence of audio data 152.

Generally, each time step in a given audio sequence corresponds to a respective time in an audio waveform and the audio sample at the time step characterizes the waveform at the corresponding time. In some implementations, the audio sample at each time step in the sequence is the amplitude of the audio waveform at the corresponding time, i.e., the sequence generated by the neural network system 100 is a raw audio waveform. In some other implementations, the audio sample at each time step in the sequence is a compressed or companded representation of the waveform at the corresponding time. For example, the audio sample can be a $\mu$-law transformed representation of the waveform.

More specifically, the neural network system 100 generates audio sequences autoregressively. That is, for each particular time step in an output audio sequence, the neural network system 100 generates the audio sample at the time step conditioned on the audio samples that have already been generated as of the particular time step, i.e., on audio samples at time steps that are earlier than the particular time step in the audio sequence.

The neural network system 100 includes a convolutional subnetwork 110 and an output layer 120.

At each time step during the generation of an audio sequence, the convolutional subnetwork 110 is configured to receive the current audio sequence, i.e., the audio sequence that has already been generated as of the time step, and to process the current audio sequence to generate an alternative representation for the time step. For example, when generating an audio sample 140 in the audio sequence 152, the convolutional subnetwork 110 can receive a current audio sequence 142 that includes the audio samples that precede the audio sample 140 in the audio sequence 152 and process the current audio sequence 142 to generate an alternative representation 144.

The output layer 120 is configured to, at each of the time steps, receive the alternative representation at the time step and generate a score distribution over possible audio samples for the time step. The score distribution includes a respective score for each of multiple possible audio samples. In some implementations, the output layer 120 is a softmax output layer. For example, the output layer 120 can receive the alternative representation 144 and process the alternative representation 144 to generate a score distribution 146.

In particular, when the neural network system 100 is configured to generate raw audio data, the score distribution includes a respective score for each of multiple possible amplitude values. When the neural network system 100 is configured to generate compressed or companded values, the score distribution includes a respective score for each of multiple possible compressed or companded values.

Once the output layer 146 has generated the score distribution for a given time step, the neural network system 100 can select an audio sample to be included in the output sequence at the given time step from the multiple possible audio samples in accordance with the score distribution for the given time step. For example, the neural network system 100 can select an audio sample by sampling from the score distribution, i.e., sampling from the possible audio samples in accordance with the scores in the score distribution so that each audio sample is selected with a likelihood that corresponds to the score for the audio sample, or can select the possible audio sample having the highest score according to the score distribution.

The convolutional subnetwork 110 generally includes multiple audio-processing convolutional neural network layers. More specifically, the audio-processing convolutional neural network layers include multiple causal convolutional layers.

A causal convolutional layer is a convolutional layer that operates on an input sequence that has a respective input at each of multiple time steps by, for each time step, generating an output that depends only on the inputs at the time step and at the time steps before the time step in the input sequence, i.e., and not on any inputs at any time steps after the time step in the input sequence. In some cases, the causal convolutional layers are implemented by applying a normal convolution and then shifting each output of the normal convolution by a few time steps, i.e., shifting each output forward by (filter length—1) time steps, prior to applying the activation function for the convolutional layer, where "filter length" is the length of the filter of the convolution that is being applied.

To increase the receptive field of the audio-processing convolutional layers without requiring an excessive number of layers or filters of excessive length, some or all of the audio-processing convolutional layers can be dilated causal convolutional layers. A dilated convolution is a convolution where the filter is applied over an area larger than its length by skipping input values with a certain step that is defined by the dilation value for the dilated convolution. By incorporating dilated causal convolutions, the audio-processing neural network layers effectively operate on their inputs with a coarser scale than with a normal convolution.

In some implementations, the audio-processing neural network layers include a stack of multiple blocks of dilated causal convolutional layers. Each block in the stack can include multiple dilated convolutional neural network layers with increasing dilation. For example, within a block, the dilation can double for each layer starting from an initial dilation, and then return to the initial dilation for the first layer in the next block. As an illustrative example, the dilations of the dilated convolutional layers in a block can be, in order: 1, 2, 4, . . . , 512. A simplified example of a block of dilated causal convolutional layers is described below with reference to FIG. 2.

In some implementations, the convolutional subnetwork includes residual connections, skip connections, or both. An example architecture of the convolutional subnetwork that includes both residual connections and skip connections is described below with reference to FIG. 3.

In some implementations, the neural network system 100 generates audio sequences conditioned on a neural network input. For example, the neural network system 100 can generate the audio sequence 152 conditioned on a neural network input 102.

In some cases, the neural network input includes one or more local features, i.e., one or more features that are different for different time steps in the output sequence. For example, the neural network system 100 can obtain as input linguistic features of a text segment and can generate an audio sequence that represents a verbalization of the text segment, i.e., the neural network system 100 can function as part of a text-to-speech system that converts written text to spoken speech and also includes a component that verbalizes the audio sequence generated by the neural network system 100.

In some other cases, the neural network input includes one or more global features, i.e., one or more features that are the same throughout the entire output sequence. As an example, the neural network system 100 can generate speech conditioned on an identity of the speaker, i.e., so that the speech is generated to sound like the voice of the speaker. In this example, the neural network system 100 can obtain a vector encoding the identity of the speaker, e.g., a one-hot encoded vector identifying the speaker, and condition the generated speech on the obtained vector.

Generally, the audio sequences are conditioned on the neural network input by conditioning the activation function of some or all of the convolutional layers in the convolutional subnetwork. That is, the output of the activation function and, accordingly, the output of the convolutional layer, is dependent not only on the output of the convolution performed by the layer but also on the neural network input.

Conditioning an activation function of a convolutional layer on the neural network input will be described in more detail below with reference to FIG. 3.

Figure 2:
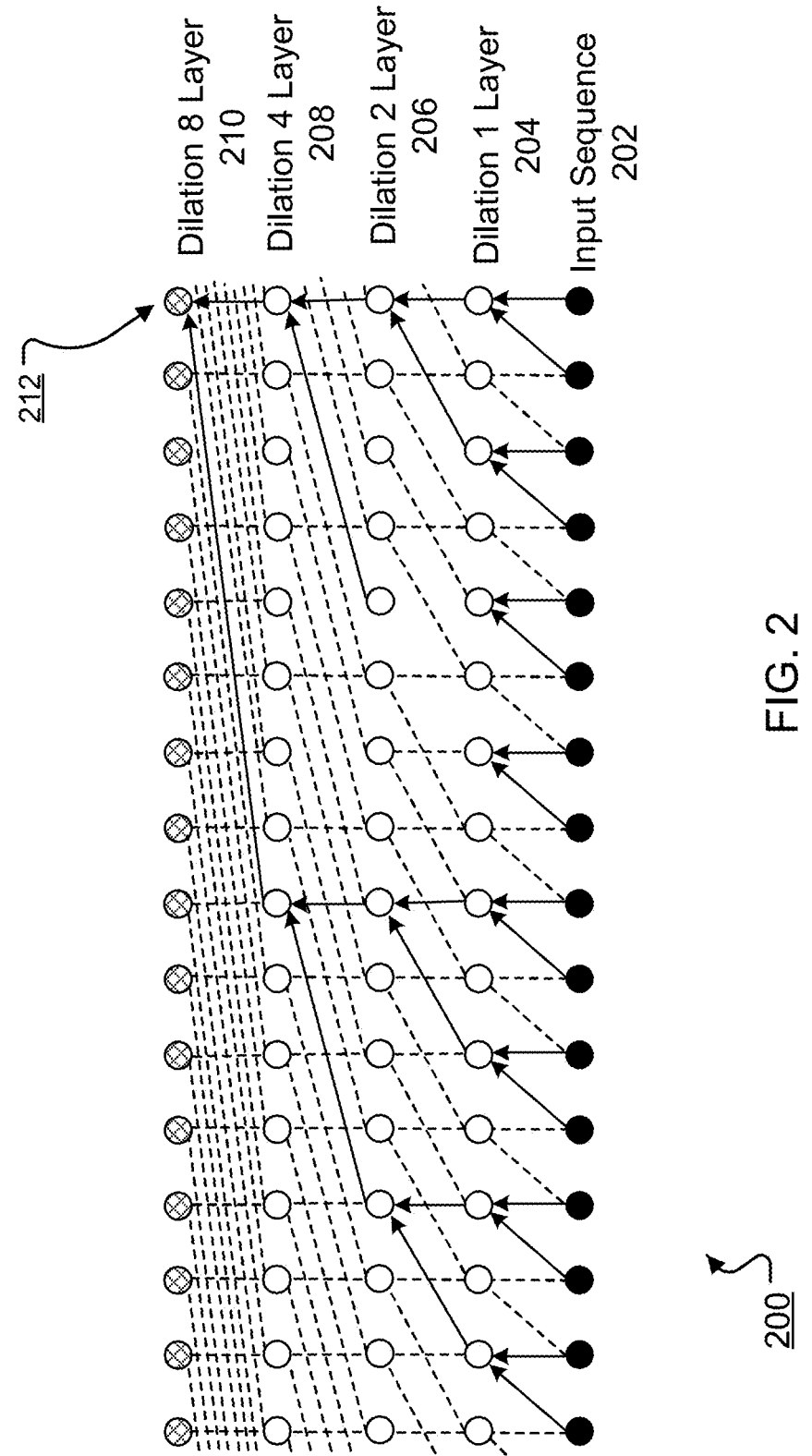
FIG. 2 shows a visualization of an example block of dilated causal convolutional layers.

FIG. 2 shows a visualization 200 of an example block of dilated causal convolutional layers. In particular, the example block includes a dilated causal convolutional layer 204 with dilation one, a dilated causal convolutional layer 206 with dilation two, a dilated causal convolutional layer 208 with dilation four, and a dilated causal convolutional layer 210 with dilation eight.

In the visualization 200, the block of dilated causal convolutional layers are operating on a current input sequence 202 to generate an output sequence. In particular, the visualization 200 visualizes using bold arrows how the block generates the output 212 that is the output at the time step that is currently the last time step in the current input sequence 202 and the output sequence.

As can be seen from the visualization 200, because each layer in the block is a causal convolutional layer, the output 212 depends only on outputs that are at the last current time step or time steps before the last current time step in the various sequences operated on by the layers in the block.

Additionally, as can be seen from the visualization 200, the layers in the block are arranged in order of increasing dilation, with the first layer in the block, i.e., dilated causal convolutional layer 204, having dilation one and the last layer in the block, i.e., dilated causal convolutional layer 204, having dilation eight. In particular, as is shown by the bold arrows in the visualization 200, because the dilated causal convolutional layer 204 has dilation one, the filter of the layer 204 is applied to adjacent inputs in the current input sequence 202. Because the dilated causal convolutional layer 206 has dilation two, the filter of the layer 206 is applied to outputs that are separated by one output in the output sequence generated by the layer 204. Because the dilated causal convolutional layer 208 has dilation four, the filter of the layer 208 is applied to outputs that are separated by three outputs in the output sequence generated by the layer 206. Because the dilated causal convolutional layer 210 has dilation eight, the filter of the layer 210 is applied to outputs that are separated by seven outputs in the output sequence generated by the layer 208.

Figure 3:
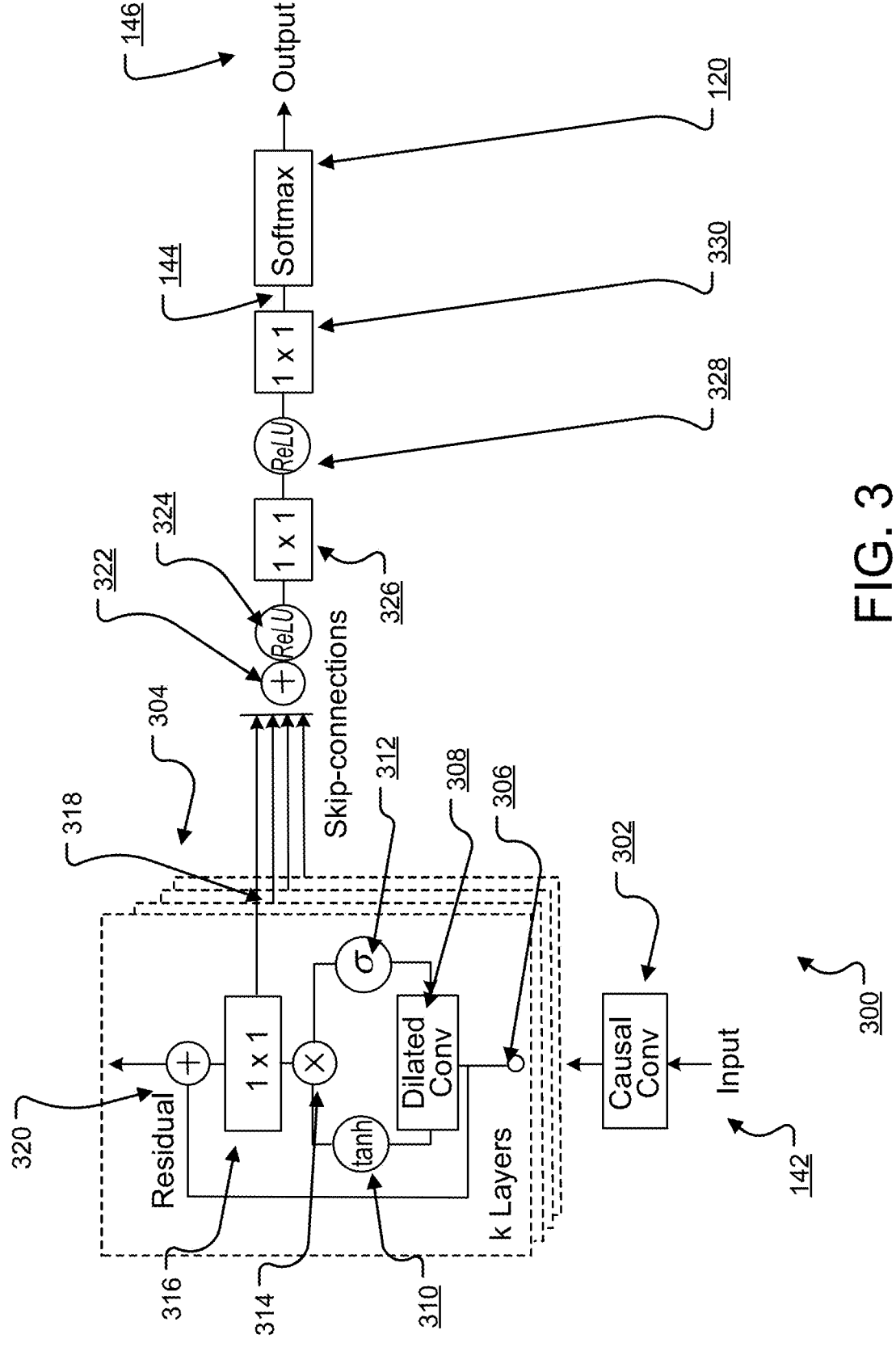
FIG. 3 shows an example architecture for the convolutional subnetwork.

FIG. 3 shows an example architecture 300 for the convolutional subnetwork 110 of FIG. 1. As described above, in the example architecture 300, the dilated causal convolutional layers that are in the convolutional subnetwork have residual connections and skip connections.

In particular, in the architecture 300, the convolutional subnetwork 110 includes a causal convolutional layer 302 that processes the current output sequence 142, i.e., by applying a causal convolution to the current output sequence 142.

The convolutional subnetwork 110 then processes the output of the causal convolutional layer 302 through a stack of dilated causal convolutional layers.

Each dilated causal convolutional layer 304 in the stack applies a dilated causal convolution 308 to the input 306 to the dilated causal convolutional layer 304. As described above, in some implementations, the dilated causal convolutional layers in the stack are arranged in blocks, with the dilation of the dilated causal convolutions applied by each layer increasing within a given block and then restarting at the initial value for the first layer in the next block.

In some implementations, the dilated causal convolutional layers in the stack have a gated activation function in which the output of an element-wise non-linearity, i.e., of a conventional activation function, is element-wise multiplied by a gate vector. In some of these implementations, the dilated causal convolution 308 includes two dilated causal convolutions on the layer input 302—a first dilated causal convolution between a main filter for the layer 304 and the layer input 306 and another dilated causal convolution between a gate filter for the layer 304 and the layer input 306. In others of these implementations, dilated causal convolution 308 is a single dilated causal convolution and half of the output of the single convolution is provided as the output of the dilated causal convolution between the main filter for the layer 304 and the layer input 306 and the other half of the output of the single convolution is provided as the output of the dilated causal convolution between the gate filter for the layer 304 and the layer input 306.

The dilated causal convolutional layer 304 then determines the output of the activation function of the layer 304 using the outputs of the dilated causal convolution.

In particular, when the activation function is a gated activation function and the output sequence being generated is not conditioned on a neural network input, the layer 304 applies an element-wise non-linear function 310 which, in the example of FIG. 3 is the tanh function, to the output of the dilated convolution with the main filter and applies an element-wise gating function which, in the example of FIG. 3, is the sigmoid function, to the output of the dilated convolution with the gate filter. The layer 304 then performs an element-wise multiplication 314 between the output of the non-linear function 310 and the output of the gating function 312 to generate the activation function output.

More specifically, when the element-wise non-linearity is tanh and the element-wise gating function is the sigmoid function, the output of the activation function z for a layer k satisfies:

$$z = \tanh(W_{f,k} * x) \odot \sigma(W_{g,k} * x),$$

where $W_{f,k}$ is the main filter for the layer k, x is the layer input, * denotes a causal dilated convolution, $\odot$ denotes element-wise multiplication, and $W_{g,k}$ is the gate filter for the layer k.

When the output sequence being generated is conditioned on a neural network input, the layer 304 also conditions the output of the activation function on the neural network input. In particular, the non-linear function and the gating function each take as input a combination of the corresponding dilated convolution output and an input generated from the neural network input.

More specifically, when the neural network input includes global features and is therefore the same for all of the time steps in the sequence, the element-wise non-linearity is tanh and the element-wise gating function is the sigmoid function, the output of the activation function z for the layer k satisfies:

$$z = \tanh\left(W_{f,k} * x + V_{f,k}^T h\right) \odot \sigma\left(W_{g,k} * x + V_{g,k}^T h\right),$$

where $$V_{f,k}^T$$

is a main learnable linear projection (of h to the main component of the activation function) for the layer k, h is the neural network input, and $$V_{f,k}^T$$

is a gate learnable linear projection (of h to the gate component of the activation function) for the layer k.

Alternatively, when the neural network input includes local features, i.e., features that change from time step to time step, the system 100 obtains a sequence y that includes a set of features for each time step in the output sequence. The output of the activation function z for the layer k then satisfies:

$$z = \tanh(W_{f,k} * x + V_{f,k} * y) \odot \sigma(W_{g,k} * x + V_{g,k} * y),$$

where $V_{f,k}*y$ and $V_{g,k}*y$ are respective 1×1 convolutions. In some implementations, the system 100 directly receives the sequence y as the neural network input, i.e., directly receives a sequence that has the same resolution as the output sequence. In other implementations, the system 100 receives a sequence having a lower resolution, i.e., with a lower sampling frequency, than the output sequence. In these cases, the system can generate the sequence y by processing the lower resolution sequence using a transposed (learned upsampling) convolutional network to generate the sequence y or can repeat values from the lower resolution sequence across time to generate the sequence y.

As an example, when the local features are linguistic features for use in text to speech generation, the linguistic features can include some or all of phone, syllable, word, phrase, and utterance-level features of the text. Example sets of linguistic features that can be used are described in Zen, Heiga, *An example of context-dependent label format for HMM-based speech synthesis in English,* 2006, URL http://hts.sp.nitech.ac.jp/?Download and Zen, Heiga, Senior, Andrew, and Schuster, Mike, *Statistical parametric speech synthesis using deep neural networks,* In Proc. ICASSP, pp. 7962-7966, 2013.

Because the architecture 300 includes skip connections and residual connections for the dilated causal convolutional layers, the layer 304 then performs a 1×1 convolution 316 on the activation function output.

The layer 304 provides the output of the 1×1 convolution as the skip output 318 of the layer and adds the residual, i.e., the layer input 306, and the output of the 1×1 convolution to generate the final output 320 of the layer 304. The convolutional subnetwork 110 then provides the final output 320 as the layer input to the next dilated convolutional layer in the stack.

In some implementations, the layer 304 performs two 1×1 convolutions on the activation function output, one with a residual filter and the other with a skip filter. In these implementations, the layer 304 provides the output of the convolution with the skip filter as the skip output 318 of the layer and adds the residual and the output of the 1×1 convolution with the residual filter to generate the final output 320 of the layer 304.

The convolutional subnetwork 110 then provides the final output 320 as the layer input to the next dilated convolutional layer in the stack. For the last layer in the stack, because there is no next layer, the convolutional subnetwork 110 can either discard the final output 320 generated by the last layer or can refrain from computing a final output, i.e., can refrain from performing the 1×1 convolution and the residual sum for the last layer in the stack.

Once the processing of all of the layers 304 in the stack of dilated convolutional layers has been completed, the convolutional subnetwork 110 sums 322 the skip outputs generated by the layers 304. The convolutional subnetwork 110 can then apply one or more non-linear functions, one or more 1×1 convolutions, or both to the sum 322 to generate the alternative representation 144. In particular, in the example of FIG. 3, the convolutional subnetwork 110 applies an element-wise non-linearity 324, e.g., a ReLU, followed by a 1×1 convolution 326, followed by another element-wise non-linearity 328, and followed by a final 1×1 convolution 330, to generate the alternative representation 144.

As described above, the output layer 120 then processes the alternative representation 144 to generate the score distribution 146.

Figure 4:
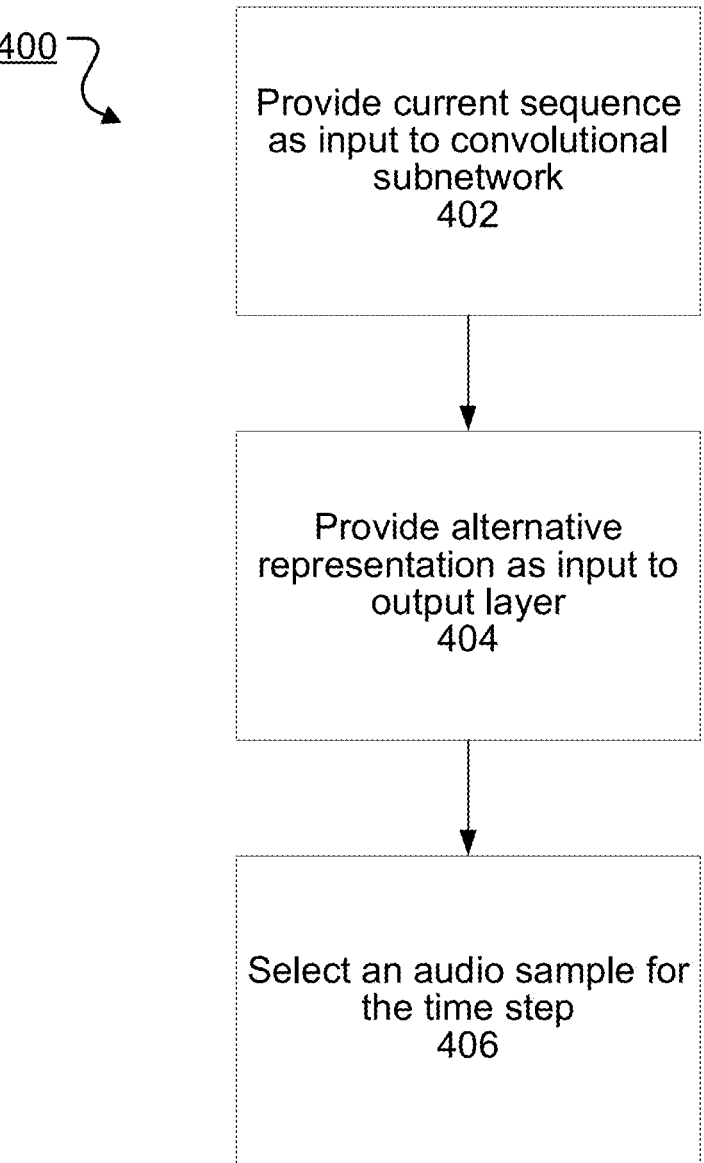
FIG. 4 is a flow diagram of an example process for generating an audio sample at a given time step in an audio sequence.

FIG. 4 is a flow diagram of an example process 400 for generating an audio sample at a given time step in an audio sequence. For convenience, the process 400 will be described as being performed by a system of one or more computers located in one or more locations. For example, a neural network system, e.g., the neural network system 100 of FIG. 1, appropriately programmed, can perform the process 400.

The system provides a current audio sequence as input to the convolutional subnetwork (step 402). The current audio sequence is the audio sequence that has already been generated as of the given time step, i.e., a sequence that includes the output audio samples at time steps before the given time step. As described above, the convolutional subnetwork includes audio-processing convolutional neural network layers, e.g., dilated causal convolutional layers, and is configured to process the current sequence of audio data to generate an alternative representation for the given time step.

The system provides the alternative representation as input to an output layer, e.g., a softmax output layer (step 404). The output layer is configured to process the alternative representation to generate a score distribution over possible audio samples for the time step.

The system selects an audio sample for inclusion in the audio sequence at the given time step in accordance with the score distribution (step 406). For example, the system can sample a possible audio sample in accordance with the score distribution.

The system may be trained on raw or compressed and/or companded audio data, for example waveforms of human speakers, music and so forth. Optionally conditioning data may be included, for example text-to-speech data, which may be represented as linguistic features derived from text paired with audio data for a verbalization of the text. At training time, i.e., during the training of the convolutional subnetwork and the output layer to determine trained values of the filters of the convolutional layers and any other parameters of the system, the system can generate the conditional predictions for all time steps in parallel, i.e., instead of autoregressively, because all time steps of the ground truth output that should be generated by the system are known. Generally, the system can perform the training to determine the trained values of the parameters using conventional supervised learning techniques, e.g., a stochastic gradient descent with backpropagation based technique. As described above, because of this parallelization and the use of causal convolutional layers, the system does not need as many computational resources to train as other systems, e.g., those that include recurrent neural network layers, resulting in a reduced training time.

Additionally, because the system generates output sequences auto-regressively, in some implementations, the convolutional subnetwork reuses values computed for previous time steps when computing the alternative representation for the given time step. In particular, because the same audio samples are provided as input to the subnetwork more than once, some of the computation performed by the convolutional subnetwork will be the same at multiple different time steps. In these implementations, rather than re-compute these computations each time step, the convolutional subnetwork can store the output values of the computation the first time that the computation is performed and then re-use the stored output values at subsequent time steps. As a simple example, the first convolutional layer in the convolutional subnetwork will apply the same filter or filters multiple times to the same audio sample values during the generation of an audio sequence. Rather than re-compute the output of these filter applications at each time step, the system can re-use outputs computed at previous time steps.

In some implementations, as another way to increase the receptive field, one stack of dilated causal convolutional layers with a very large (long) receptive field, but preferably fewer units per layer, may be employed to condition another (larger) stack with a smaller receptive field. The larger stack may process a shorter part of the audio signal, for example cropped at the end.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

receiving data characterizing a sequence of text;

processing a network input comprising the data characterizing the sequence of text using a neural network to generate a neural network output that defines audio data that is a verbalization of the sequence of text characterized by the network input, wherein:

the neural network comprises a sequence of one or more convolutional neural network layers; and each convolutional neural network layer in the sequence of one or more convolutional neural network layers is configured to:

receive a layer input;

apply one or more convolution operations to the layer input; and generate a layer output based at least in part on a result of applying the one or more convolution operations to the layer input;

wherein the neural network output directly comprises amplitude values of an audio waveform that is the verbalization of the sequence of text characterized by the network input, wherein the amplitude values of the audio waveform are directly generated as an output of an output neural network layer of the neural network, and wherein the neural network has been trained by applying a supervised learning technique that depends on (i) ground truth output audio waveforms for each of a set of training examples for the neural network and (ii) corresponding output audio waveforms generated by the neural network.

2. The method of claim 1, wherein the data characterizing the sequence of text comprises a sequence of phonemes corresponding to the sequence of text.

3. The method of claim 1, wherein for each of one or more convolutional neural network layers in the sequence of one or more convolutional neural network layers, applying one or more convolution operations to the layer input comprises:

applying one or more dilated convolution operations to the layer input.

4. The method of claim 3, wherein the sequence of one or more convolutional neural network layers comprises a plurality of convolutional neural network layers that each implement respective dilated convolution operations associated with a respective different dilation rate.

5. The method of claim 4, wherein the sequence of convolutional neural network layers comprises a plurality of convolutional neural network layers that each have a dilation rate that is a constant multiple of a dilation rate of a preceding convolutional neural network layer.

6. The method of claim 1, wherein for each of one or more convolutional neural network layers in the sequence of one or more convolutional neural network layers, the convolutional neural network layer comprises a gated activation unit that is configured to:

process the layer input by a main convolutional operation to generate a main convolutional output;

process the layer input by a gate convolutional operation to generate a gating convolutional output; and generate a gated activation unit output by element-wise multiplying the main convolutional output and the gating convolutional output.

7. The method of claim 1, wherein the sequence of one or more convolutional neural network layers comprises one or more residual connections, wherein each residual connection is configured to route the layer input to the convolutional neural network layer to a summer that sums the layer input with an intermediate output generated by the convolutional neural network layer, wherein the layer output is based at least in part on the sum of the layer input with the intermediate output.

8. The method of claim 1, wherein the sequence of one or more convolutional neural network layers comprises a plurality of convolutional neural network layers.

9. The method of claim 1, wherein the neural network is conditioned on speaker identity data; and wherein the audio data that is the verbalization of the sequence of text is expressed in a voice associated with the speaker identity data.

10. The method of claim 1, further comprising:

evaluating an objective function that measures an error in the audio waveform; and backpropagating gradients of the objective function through the neural network.

11. The method of claim 1, wherein:

the network input comprises data characterizing a conditioning input; and wherein processing the network input comprising the data characterizing the sequence of text using the neural network to generate the neural network output that defines audio data that is the verbalization of the sequence of text characterized by the network input comprises:

processing the network input comprising the data characterizing the sequence of text using the neural network and the data characterizing the conditioning input to generate the neural network output that defines audio data that is the verbalization of the sequence of text characterized by the network input, as conditioned on the conditioning input.

12. The method of claim 11, wherein the conditioning input comprises image data.

13. The method of claim 11, wherein the conditioning input comprises video data.

14. The method of claim 11, wherein the conditioning input comprises data characterizing a particular speaker for the verbalization of the sequence of text.

15. The method of claim 11, wherein the conditioning input comprises data characterizing a particular language for the verbalization of the sequence of text.

16. The method of claim 11, wherein the conditioning input comprises data characterizing particular music for the verbalization of the sequence of text.

17. A system comprising:

one or more computers; and one or more storage devices communicatively coupled to the one or more computers, wherein the one or more storage devices store instructions that, when executed by the one or more computers, cause the one or more computers to perform operations comprising:

receiving data characterizing a sequence of text;

processing a network input comprising the data characterizing the sequence of text using a neural network to generate a neural network output that defines audio data that is a verbalization of the sequence of text characterized by the network input, wherein:

the neural network comprises a sequence of one or more convolutional neural network layers; and each convolutional neural network layer in the sequence of one or more convolutional neural network layers is configured to:

receive a layer input;

apply one or more convolution operations to the layer input; and generate a layer output based at least in part on a result of applying the one or more convolution operations to the layer input;

wherein the neural network output directly comprises amplitude values of an audio waveform that is the verbalization of the sequence of text characterized by the network input, and wherein the amplitude values of the audio waveform are directly generated as an output of an output neural network layer of the neural network, and wherein the neural network has been trained by applying a supervised learning technique that depends on (i) ground truth output audio waveforms for each of a set of training examples for the neural network and (ii) corresponding output audio waveforms generated by the neural network.

18. The system of claim 17, wherein the data characterizing the sequence of text comprises a sequence of phonemes corresponding to the sequence of text.

19. One or more non-transitory computer storage media storing instructions that when executed by one or more computers cause the one or more computers to perform operations comprising:

receiving data characterizing a sequence of text;

processing a network input comprising the data characterizing the sequence of text using a neural network to generate a neural network output that defines audio data that is a verbalization of the sequence of text characterized by the network input, wherein:

the neural network comprises a sequence of one or more convolutional neural network layers; and each convolutional neural network layer in the sequence of one or more convolutional neural network layers is configured to:

receive a layer input;

apply one or more convolution operations to the layer input; and generate a layer output based at least in part on a result of applying the one or more convolution operations to the layer input;

wherein the neural network output directly comprises amplitude values of an audio waveform that is the verbalization of the sequence of text characterized by the network input, wherein the amplitude values of the audio waveform are directly generated as an output of an output neural network layer of the neural network, and wherein the neural network has been trained by applying a supervised learning technique that depends on (i) ground truth output audio waveforms for each of a set of training examples for the neural network and (ii) corresponding output audio waveforms generated by the neural network.

20. The non-transitory computer storage media of claim 19, wherein the data characterizing the sequence of text comprises a sequence of phonemes corresponding to the sequence of text.

\* \* \* \* \*